(12) United States Patent
Ain et al.

(10) Patent No.: US 7,486,889 B2
(45) Date of Patent: Feb. 3, 2009

(54) TRANSCEIVER TEST MODULE EMPLOYING AN OPTICAL WRAP

(75) Inventors: Jonathan Wade Ain, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/473,975

(22) Filed: Jun. 23, 2006

(65) Prior Publication Data

US 2007/0297749 A1 Dec. 27, 2007

(51) Int. Cl.
*H04B 10/08* (2006.01)
*H04B 17/00* (2006.01)

(52) U.S. Cl. .................. 398/22; 398/137; 398/139; 398/16; 398/30; 398/33; 385/147

(58) Field of Classification Search .......... 398/22
See application file for complete search history.

(56) References Cited

U.S. PATENT DOCUMENTS

| | | | |
|---|---|---|---|
| 5,086,506 A | | 2/1992 | Hall et al. ................. 455/8 |
| 5,337,316 A | | 8/1994 | Weiss et al. ................. 371/20.5 |
| 5,345,230 A | * | 9/1994 | Jackson et al. ............ 340/3.51 |
| 5,471,649 A | * | 11/1995 | Rees et al. ................ 455/67.14 |
| 5,506,709 A | * | 4/1996 | Segal et al. .................... 398/22 |
| 6,487,681 B1 | | 11/2002 | Tuttle et al. .................... 714/25 |
| 2004/0136722 A1 | * | 7/2004 | Mahowald et al. .......... 398/138 |
| 2004/0184410 A1 | * | 9/2004 | Park ............................ 370/250 |
| 2005/0111843 A1 | * | 5/2005 | Takeuchi et al. ............. 398/38 |

\* cited by examiner

*Primary Examiner*—Sung H Pak
*Assistant Examiner*—Chad H Smith
(74) *Attorney, Agent, or Firm*—John H. Holcombe (57) ABSTRACT

A transceiver test module and method for testing an optical transceiver. An optical wrap interconnects the optical transmitter and optical receiver of an optical transceiver. A processor system reads information from an optical transceiver; provides a signal to the optical transceiver to operate the optical transceiver to transmit a signal at the optical transmitter, which is received via the optical wrap; detects diagnostic information from the optical transceiver for errors of the optical transceiver; and determines the rated speed of the optical transceiver from the read information. Operation of the optical transceiver at the rated speed is verified by the diagnostic information.

8 Claims, 10 Drawing Sheets

TRANSCEIVER TEST MODULE EMPLOYING AN OPTICAL WRAP

FIELD OF THE INVENTION

This invention relates to optical transceivers, and, more particularly, to testing optical transceivers.

BACKGROUND OF THE INVENTION

Optical transceivers typically have no direct external indication as to the speed capability of the unit, and have no display mechanism to indicate whether the unit is defective. With regard to speed capability, various units from the same manufacturer may appear identical or nearly so, and the only way to differentiate between, for example, a 2 Gb (gigabyte) transceiver and a 4 Gb transceiver, is to have the two different part numbers memorized. With regard to viability, one method to make a determination whether a transceiver is viable is to exchange a suspect transceiver with a known good one and try communication using the known good transceiver.

SUMMARY OF THE INVENTION

A transceiver test module and method for testing an optical transceiver. An optical wrap interconnects the optical transmitter and optical receiver of an optical transceiver; and a plug interface is configured to interface with a plug input/output interface of the optical transceiver. A processor system is configured to interrogate the optical transceiver via the plug interface; configured to read information from a diagnostic interface of the optical transceiver via the plug interface; configured to provide a signal to the plug interface to operate the optical transceiver to transmit a signal at the optical transmitter to be received at the optical receiver via the optical wrap; configured to detect diagnostic information from the read information of the plug interface for errors of the optical transceiver; and configured to determine the rated speed of the optical transceiver from the read information of the plug interface.

In another embodiment, the processor system is configured to provide signal(s) to operate the optical transceiver at various rated speeds; and configured to verify operation of the optical transceiver at the rated speed from the read information of the plug interface resulting from the signal to operate.

In a further embodiment, the processor system comprises a clock which operates at rates to provide the signals for each of said various rated speeds.

In a further embodiment, the transceiver test module additionally comprises a visual display; and the processor system is configured to determine a pass/fail condition of the optical transceiver from the detected errors; and configured to operate the visual display to display the determined rated speed and to display the pass/fail condition.

In another embodiment, the processor system is configured to receive data signals at the plug interface from the optical receiver of the optical transceiver; and is configured to compare the signal provided at the plug interface with the data signals received at the plug interface.

In still another embodiment, the transceiver test module comprises the optical wrap to interconnect the optical transmitter and optical receiver of an optical transceiver; and a communication system configured to communicate at an interface of the optical transceiver; configured to read information from the optical transceiver via the communication; configured to provide a signal via the communication, the signal to operate the optical transceiver to transmit signals at various rated speeds at the optical transmitter to be received at the optical receiver via the optical wrap; configured to detect diagnostic information via the communication for errors of the optical transceiver; configured to verify operation of the transceiver at the various rated speeds from the diagnostic information; and configured to determine the rated speed of the optical transceiver from the highest rated speed at which operation of the transceiver was verified.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
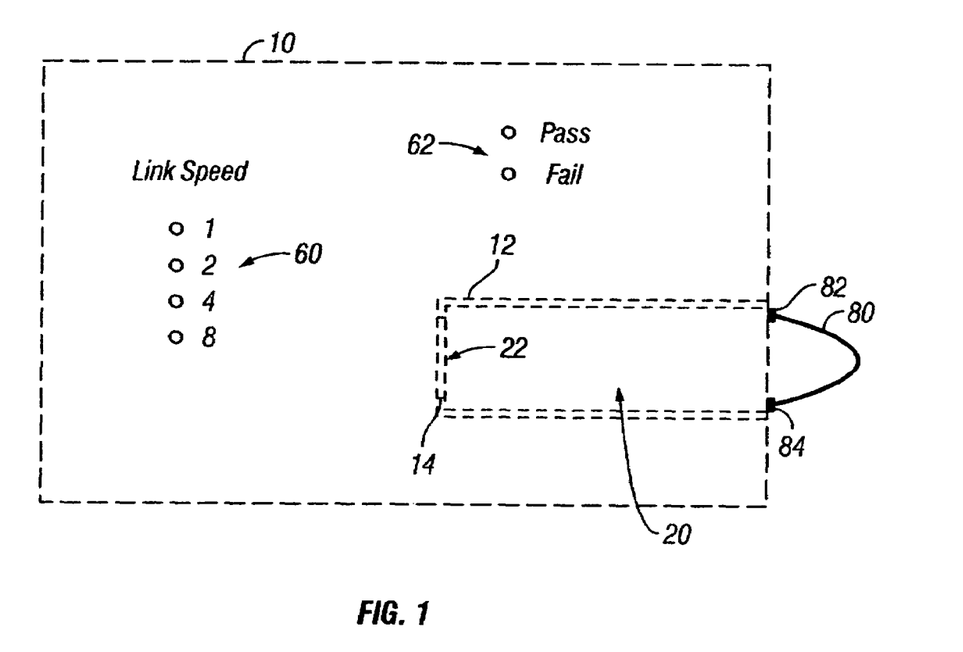
FIG. 1 is a diagrammatic illustration of a transceiver test module in accordance with an embodiment of the present invention.
Figure 2:
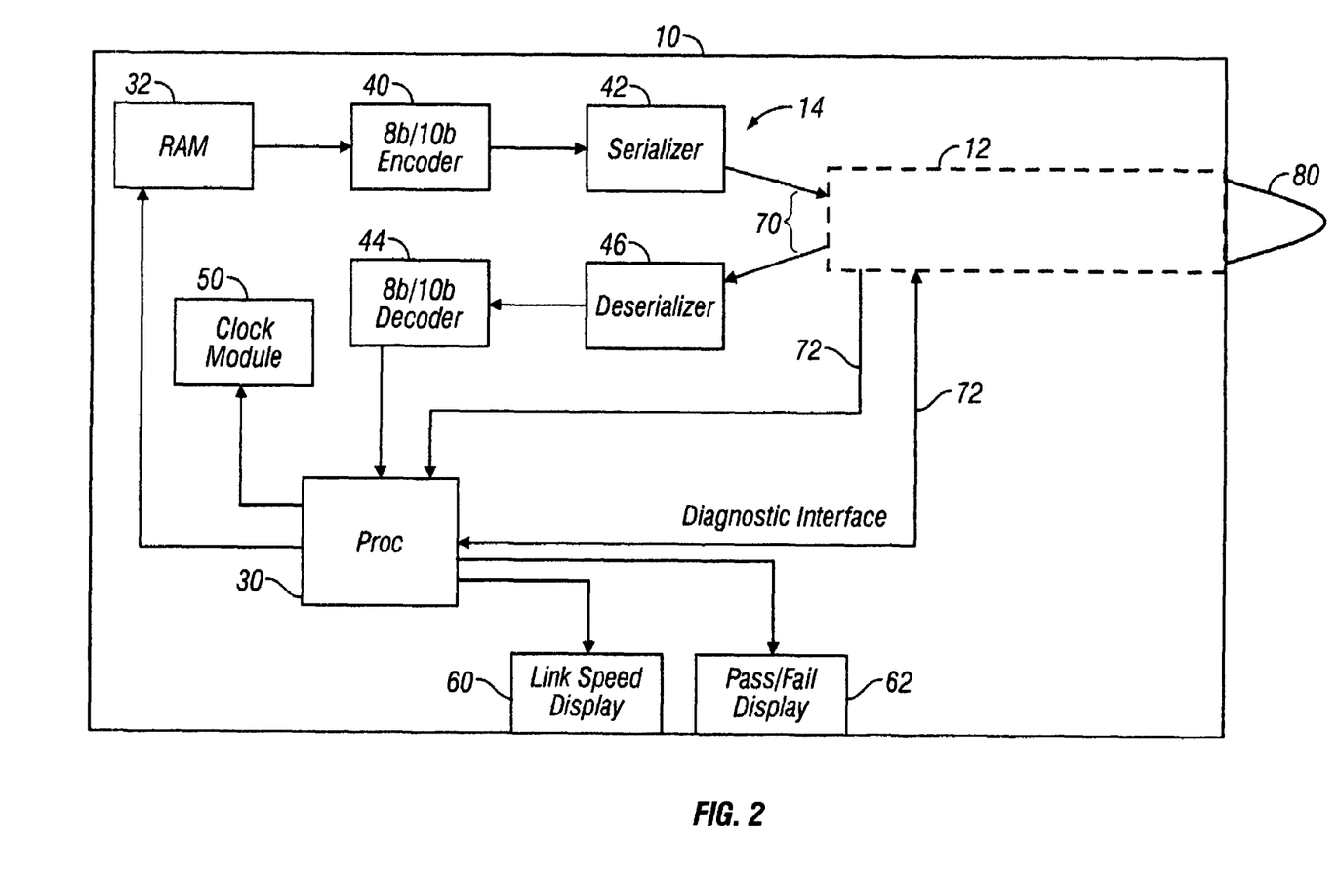
FIG. 2 is a block diagram of the transceiver test module of FIG. 1.

Referring to FIGS. 1 and 2, an embodiment of a transceiver test module 10 is illustrated having a cage 12 with a plug interface 14 for supporting an optical transceiver 20. A plug input/output interface 22 of the optical transceiver 20 plugs into the interface 14 when the optical transceiver is loaded into the transceiver test module. The plug interface 14 additionally comprises a power connection to power the optical transceiver 20.

A processor system comprises a processor 30 and memory 32 for operating the transceiver test module. The memory may comprise any suitable capability for storing information and program information for operating the processor(s) and/or for providing information or data streams. Herein, "processor" and "processor system" may comprise any suitable logic, microprocessor, and associated memory for operating the transceiver test module in accordance with instructions or preprogrammed capability, and the associated "memory" may comprise fixed or rewritable memory, and be non-volatile, volatile or both.

The plug interface 14 comprises a communications interface and may comprise an encoder 40 and serializer 42 for communication to the input/output interface of the optical transceiver, and may comprise a decoder 44 and deserializer 46 for receiving communication from the input/output interface of the optical transceiver. Herein, "communication system" may comprise a processor system and associated interfaces for communication with the input/output interface of the optical transceiver.

A clock module 50 may provide clock signals to operate the processor system, and operates the memory 32 and interface 14 to communicate with the optical transceiver at desired data rates.

Displays 60 and 62 provide human readable displays regarding the speed of the optical transceiver and regarding the viability of the optical transceiver. The displays may comprise LED's (light emitting diodes), or other suitable displays.

The plug interface 14 may interface with various pins of the input/output interface of the optical transceiver. For example, the interface may comprise data and information pins 70, and pins 72 which interface with a diagnostic interface of the optical transceiver.

An optical wrap 80 interconnects the optical transmitter 82 and optical receiver 84 of the optical transceiver, so that an optical transmission of the optical transmitter is fed back to be received by the optical receiver of the optical transceiver 20. The optical wrap 80 may comprise a length of optical fiber cabling and connectors suitable to plug into the optical transmitter output and into the optical receiver input.

Figure 3:
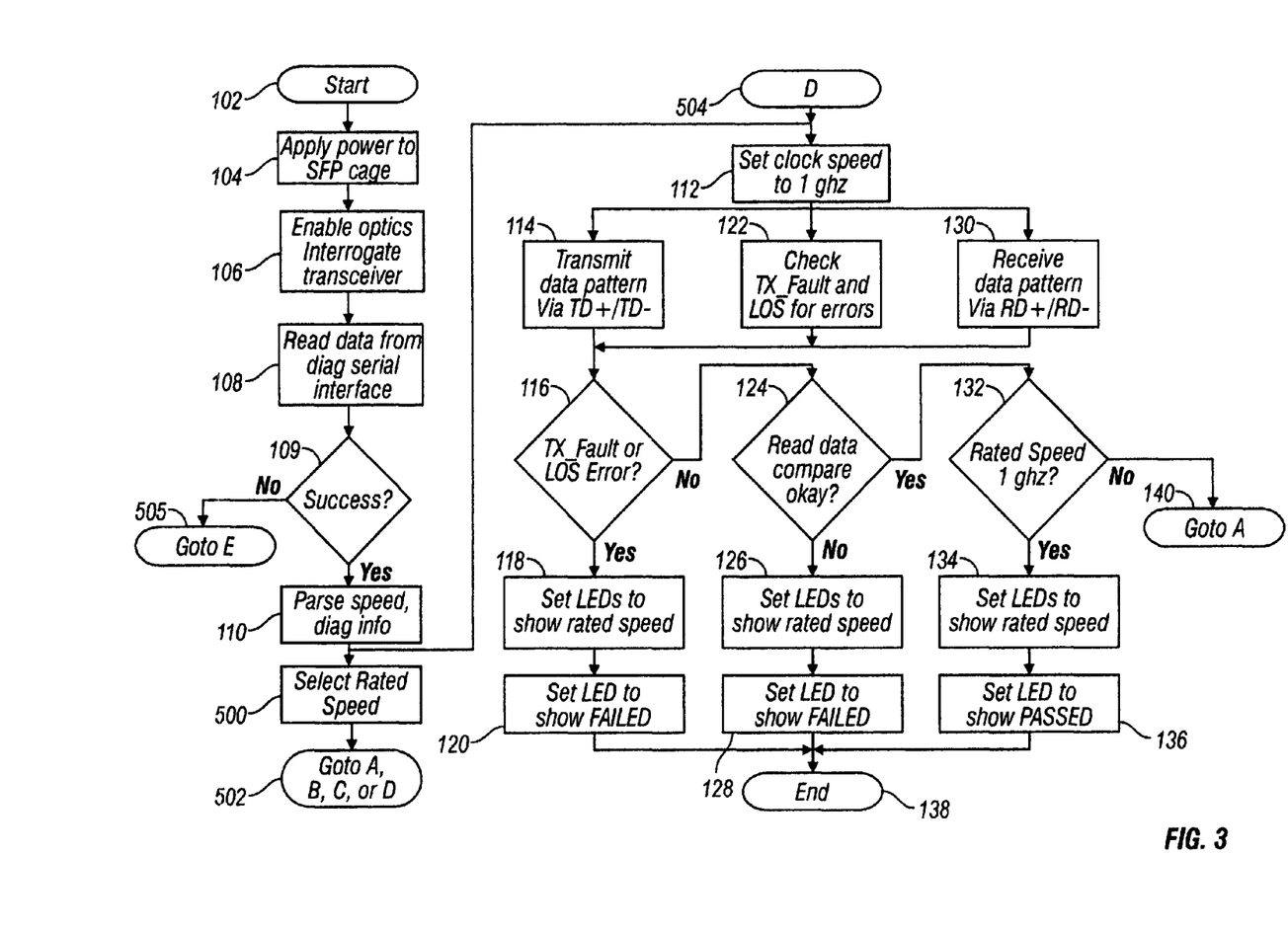
FIGS. 3, 4, 5, 6, 7, 8, 9 and 10 are flow charts depicting embodiments of the present invention employed with the transceiver test module of FIGS. 1 and 2.

Embodiments of a method of the present invention are illustrated in FIGS. 3, 4, 5 and 6, beginning at step 102. Referring to FIGS. 1, 2 and 3, in step 104, power is applied to the cage 12 to power an optical transceiver 20 that has been placed in the cage and plugged into the plug interface 14, and which has the optical wrap 80 in place. Typically, an optical transceiver will operate at its highest rated speed and at lower rated speeds, but will not operate properly at speeds greater than its highest rated speed. This is taken into account in the methods discussed herein.

In one embodiment, in step 106, the processor system and communication system enable the optics of the transceiver, and interrogate the optical transceiver via the plug interface. The interrogation is of a chipset processor or logic that operates the optical transceiver. In response to the interrogation, the transceiver may supply diagnostic information to the diagnostic pins of the interface, which diagnostic information may comprise the speed capability of the transceiver and diagnostic information regarding the operation of the transceiver. Examples of diagnostic information comprise performance information with regard to parameters such as laser bias current, transceiver temperature, and optical power, and failure information such as transmission errors or faults, receiver errors or faults, and loss of signal errors. The transmit/receive speed of the transceiver may be available in the built-in functions of the chipset of the transceiver, and the interrogation of step 106 requests that information from the chipset. In step 108, any available information from the transceiver is read. Not all transceivers supply speed information, and step 109 determines whether speed information was supplied.

In step 110, the speed information and the diagnostic information received at the plug interface 14 are parsed. The speed information is used to determine the rated speed of the transceiver 20. Step 110 continues so that specific diagnostic information may be monitored or collected during operation of the transceiver by the transceiver test module.

In one embodiment, the optical transceiver is operated at various rated speeds, for example, by setting the clock speed of clock module 50 to operate the transceiver at a first rated speed, such as 1 ghz (gigahertz), in step 112. In step 114, the transceiver test module transmits a data pattern, for example, via data and information pins 70, from processor system 30, 32, to operate the transceiver at the first rated speed. The transceiver should transmit the data pattern to the optical wrap 80 and the same transmission is therefore fed back to the receiver of the transceiver.

In step 122, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver. Those of skill in the art may select other or additional faults to monitor.

In step 130, the data pattern received by the receiver of the transceiver is provided at the data output of the transceiver, for example at pins 70, and is detected by the transceiver test module.

In step 116, the transceiver test module detects whether a transmission fault or a loss of signal was indicated in the diagnostic information from the transceiver. If so, step 118 sets the visual display 60 to show the rated speed (1 ghz), and step 120 sets the visual display 62 to show that the transceiver failed.

In step 124, the transceiver test module compares the data pattern of the signal provided at the plug interface in step 114 with the data pattern of the data signals received at the plug interface in step 130, and if the comparison is not OK, step 126 sets the visual display 60 to show the rated speed (1 ghz), and step 128 sets the visual display 62 to show that the transceiver failed.

If there was no fault in step 116 and the data pattern comparison of step 124 was OK, step 132 checks to assure that the rated speed of the device was the first rated speed (1 ghz), and, if so, step 134 sets the visual display 60 to show the rated speed (1 ghz) and step 136 sets the visual display to show that the transceiver passed.

Upon either failure (steps 120 or 128) or the pass of step 136 ends the process at step 138.

Figure 4:
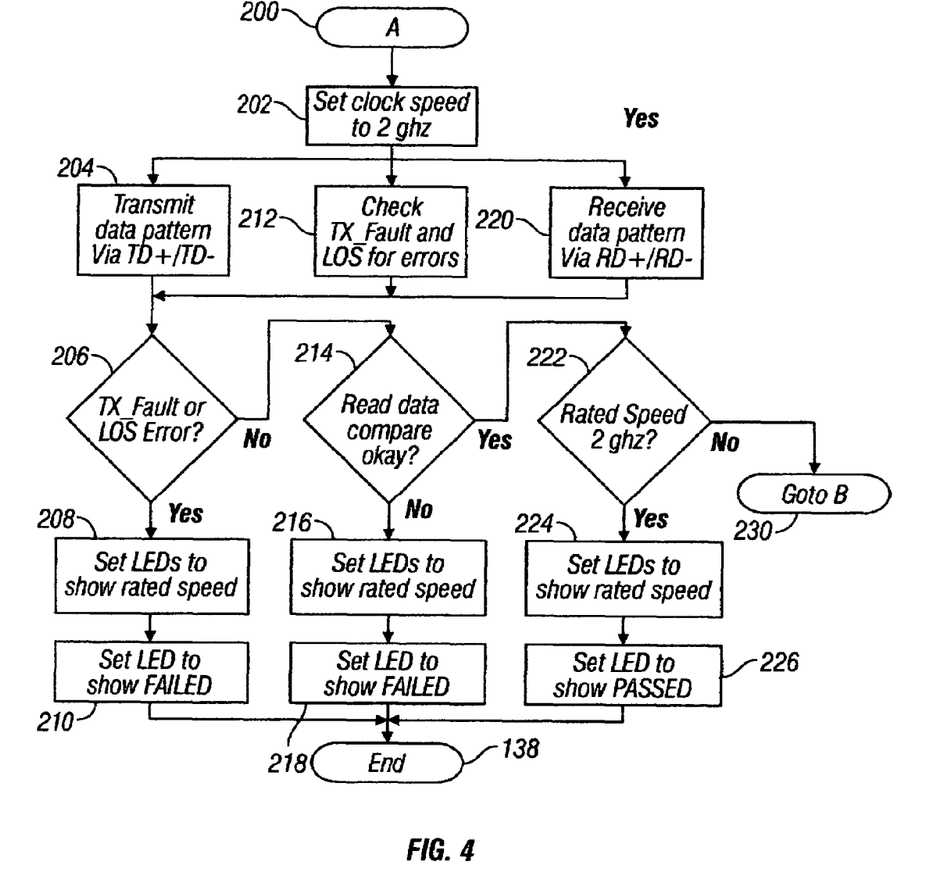

If the rated speed identified in step 110 is not the first rated speed (1 ghz) step 140 refers to connector "A" in FIG. 4. FIG. 4 relates to a second rated speed (2 ghz).

Referring to FIGS. 1, 2 and 4, step 200 refers to step 202, in which the transceiver test module sets the clock speed of clock module 50 to operate the transceiver at a second rated speed, such as 2 ghz. In step 204, the transceiver test module transmits a data pattern, for example, via data and information pins 70, from processor system 30, 32, to operate the transceiver at the second rated speed. The transceiver should transmit the data pattern to the optical wrap 80 and the same transmission is therefore fed back to the receiver of the transceiver.

In step 212, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 220, the data pattern received by the receiver of the transceiver is provided at the data output of the transceiver, for example at pins 70, and is detected by the transceiver test module.

In step 206, the transceiver test module detects whether a transmission fault or a loss of signal was indicated in the diagnostic information from the transceiver. If so, step 208 sets the visual display 60 to show the rated speed (2 ghz), and step 210 sets the visual display 62 to show that the transceiver failed.

In step 214, the transceiver test module compares the data pattern of the signal provided at the plug interface in step 204 with the data pattern of the data signals received at the plug interface in step 220, and if the comparison is not OK, step 216 sets the visual display 60 to show the rated speed (2 ghz), and step 218 sets the visual display 62 to show that the transceiver failed.

If there was no fault in step 206 and the data pattern comparison of step 214 was OK, step 222 checks to assure that the rated speed of the device determined in step 110 was the second rated speed (2 ghz), and, if so, step 224 sets the visual display 60 to show the rated speed (2 ghz) and step 226 sets the visual display to show that the transceiver passed.

Upon either failure (steps 210 or 218) or the pass of step 226 ends the process at step 138.

Figure 5:
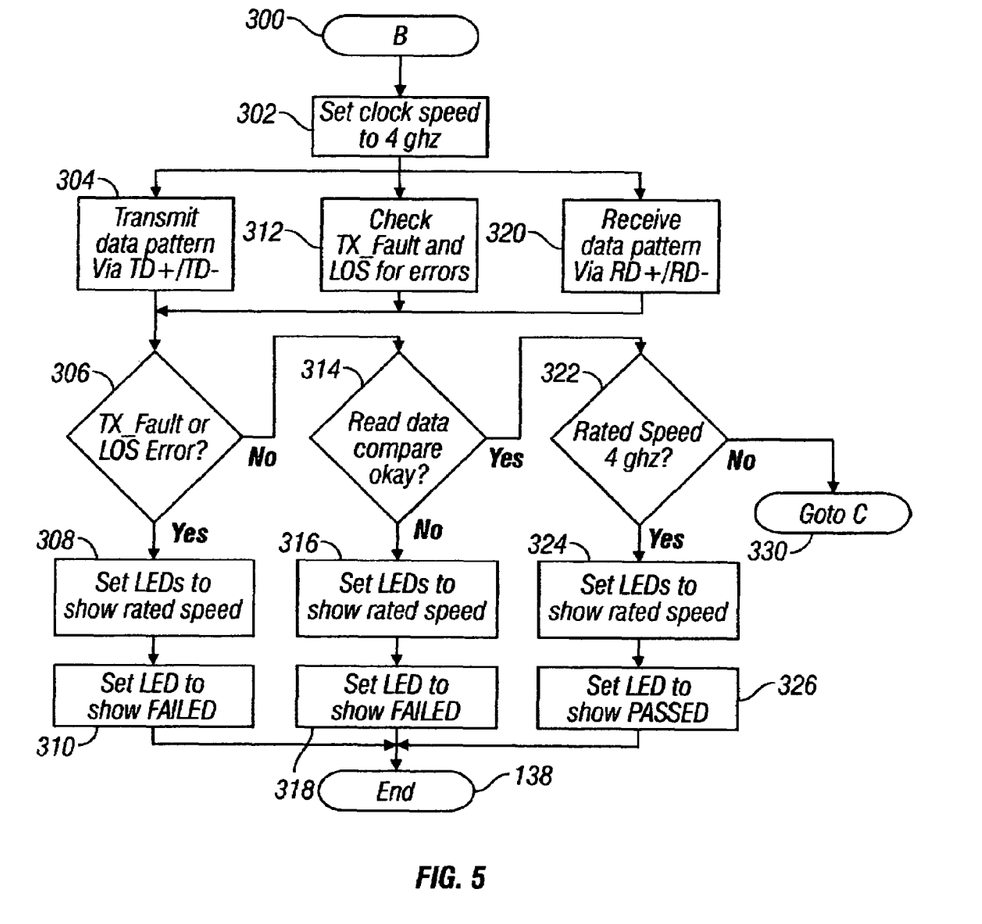

If the rated speed identified in step 110 is not the second rated speed (2 ghz), step 230 refers to connector "B" in FIG. 5. FIG. 5 relates to a third rated speed (4 ghz).

Referring to FIGS. 1, 2 and 5, step 300 refers to step 302, in which the transceiver test module sets the clock speed of clock module 50 to operate the transceiver at a third rated speed, such as 4 ghz. In step 304, the transceiver test module transmits a data pattern, for example, via data and information pins 70, from processor system 30, 32, to operate the transceiver at the third rated speed. The transceiver should transmit the data pattern to the optical wrap 80 and the same transmission is therefore fed back to the receiver of the transceiver.

In step 312, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 320, the data pattern received by the receiver of the transceiver is provided at the data output of the transceiver, for example at pins 70, and is detected by the transceiver test module.

In step 306, the transceiver test module detects whether a transmission fault or a loss of signal was indicated in the diagnostic information from the transceiver. If so, step 308 sets the visual display 60 to show the rated speed (4 ghz), and step 310 sets the visual display 62 to show that the transceiver failed.

In step 314, the transceiver test module compares the data pattern of the signal provided at the plug interface in step 304 with the data pattern of the data signals received at the plug interface in step 320, and if the comparison is not OK, step 316 sets the visual display 60 to show the rated speed (4 ghz), and step 318 sets the visual display 62 to show that the transceiver failed.

If there was no fault in step 306 and the data pattern comparison of step 314 was OK, step 322 checks to assure that the rated speed of the device determined in step 110 was the third rated speed (4 ghz), and, if so, step 324 sets the visual display 60 to show the rated speed (4 ghz) and step 326 sets the visual display to show that the transceiver passed.

Upon either failure (steps 310 or 318) or the pass of step 326 ends the process at step 138.

Figure 6:
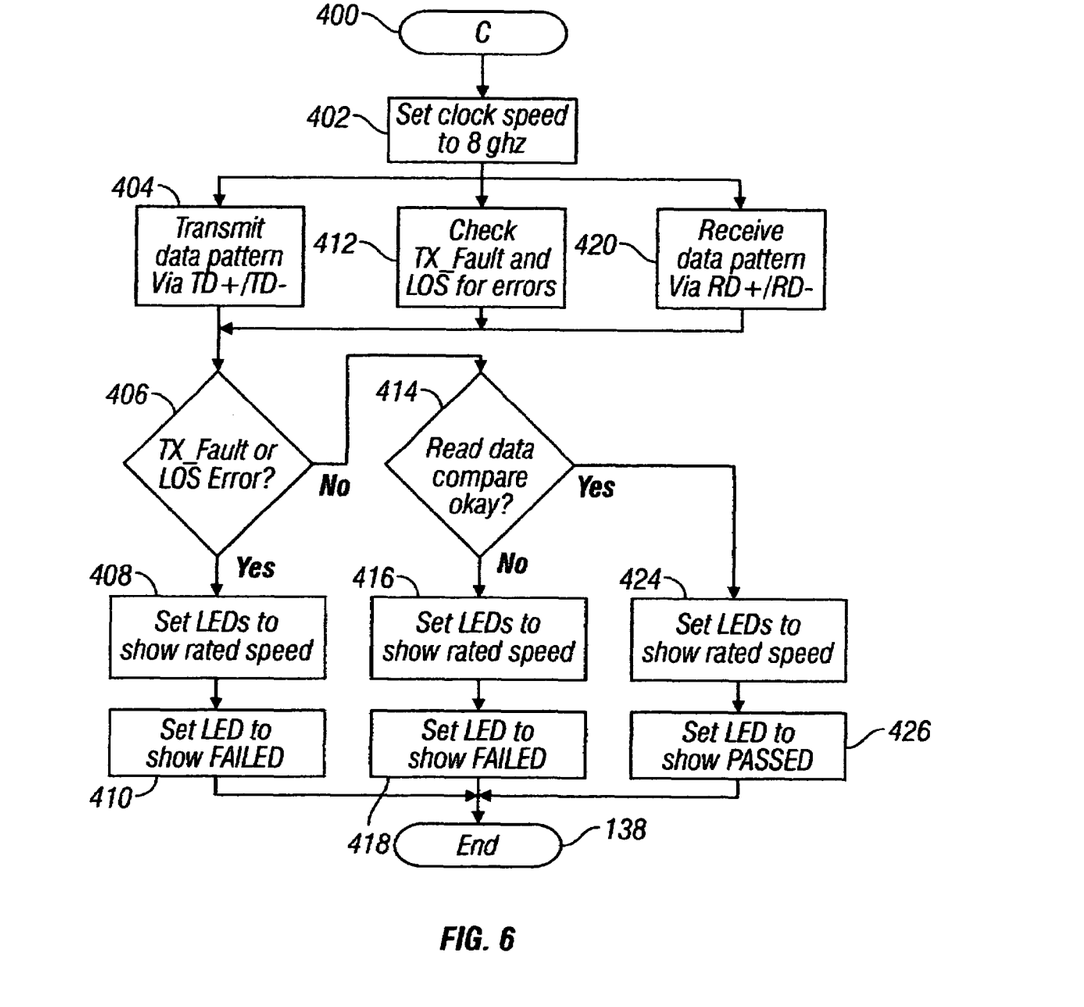

If the rated speed identified in step 110 is not the third rated speed (4 ghz), step 330 refers to connector "C" in FIG. 6. FIG. 6 relates to a fourth rated speed (8 ghz).

Referring to FIGS. 1, 2 and 6, step 400 refers to step 402, in which the transceiver test module sets the clock speed of clock module 50 to operate the transceiver at a fourth rated speed, such as 8 ghz. In step 404, the transceiver test module transmits a data pattern, for example, via data and information pins 70, from processor system 30, 32, to operate the transceiver at the fourth rated speed. The transceiver should transmit the data pattern to the optical wrap 80 and the same transmission is therefore fed back to the receiver of the transceiver.

In step 412, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 420, the data pattern received by the receiver of the transceiver is provided at the data output of the transceiver, for example at pins 70, and is detected by the transceiver test module.

In step 406, the transceiver test module detects whether a transmission fault or a loss of signal was indicated in the diagnostic information from the transceiver. If so, step 408 sets the visual display 60 to show the rated speed (8 ghz), and step 410 sets the visual display 62 to show that the transceiver failed.

In step 414, the transceiver test module compares the data pattern of the signal provided at the plug interface in step 404 with the data pattern of the data signals received at the plug interface in step 420, and if the comparison is not OK, step 416 sets the visual display 60 to show the rated speed (8 ghz), and step 418 sets the visual display 62 to show that the transceiver failed.

If there was no fault in step 406 and the data pattern comparison of step 414 was OK, and steps 132, 222 and 322 had indicated that the rated speed of the device determined in step 110 was different than the test speeds and is therefore the fourth rated speed (8 ghz), step 424 sets the visual display 60 to show the rated speed (8 ghz) and step 426 sets the visual display to show that the transceiver passed.

Upon either failure (steps 410 or 418) or the pass of step 426 ends the process at step 138.

Alternatively, referring to FIGS. 1, 2 and 3, rather than conducting tests at each of the possible rated speeds, the rated speed of the device determined in step 110 is employed in step 500 to direct the testing to only the rated speed in step 502, for example, to connector "D" 504 if the rated speed is the first rated speed, to connector "A" 200 of FIG. 4 if the rated speed is the second rated speed, to connector "B" 300 of FIG. 5 if the rated speed is the third rated speed, or to connector "C" 400 of FIG. 6 if the rated speed is the fourth rated speed.

Further, referring to FIGS. 1, 2 and 3, the speed information may not be available from the transceiver at step 108 as determined in step 109. For example, the transceiver may not be adapted for interrogation or may not disclose the rated speed. With respect to such transceivers, the interrogation of step 106 is unnecessary. Without the speed information, step 505 directs the testing to step 506 in FIG. 7 to test the transceiver at each of various speeds to determine whether the transceiver is viable and, if viable, to determine the rated speed of the device.

In accordance with the present invention, referring additionally to FIGS. 1, 2, 7, 8, 9, and 10, in step 507, the processor system sets the clock speed of clock module 50 to operate the transceiver 20 at an initial low rated speed, such as 1 ghz. In step 508, the transceiver test module transmits a data pattern, for example, via data and information pins 70, from processor system 30, 32, to operate the transceiver at the initial rated speed. The transceiver should transmit the data pattern to the optical wrap 80 and the same transmission is therefore fed back to the receiver of the transceiver.

Figure 7:
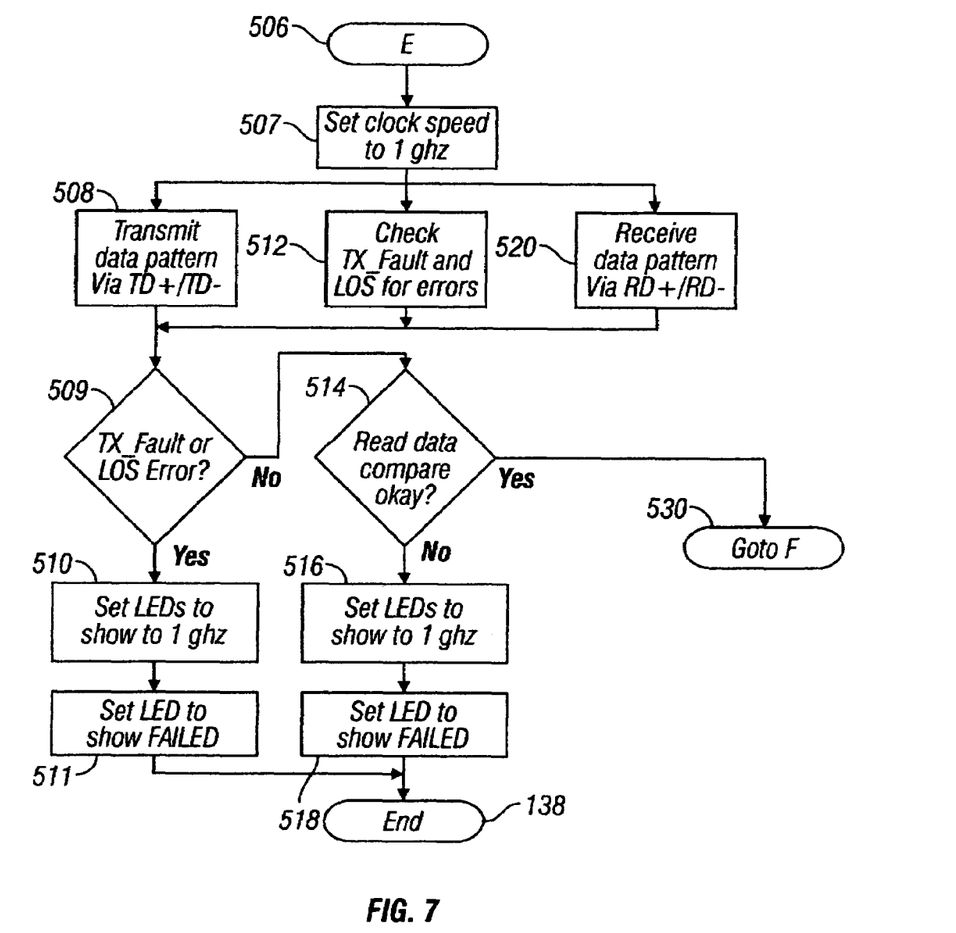

In step 512, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 520, the data pattern received by the receiver of the transceiver is provided at the data output of the transceiver, for example at pins 70, and is detected by the transceiver test module.

In step 509, the transceiver test module detects whether a transmission fault or a loss of signal was indicated in the diagnostic information from the transceiver. If so, step 510 sets the visual display 60 to show the rated speed of the test (1 ghz), and step 511 sets the visual display 62 to show that the transceiver failed.

In step 514, the transceiver test module compares the data pattern of the signal provided at the plug interface in step 508 with the data pattern of the data signals received at the plug interface in step 520, and if the comparison is not OK, step 516 sets the visual display 60 to show the rated speed of the test (1 ghz), and step 518 sets the visual display 62 to show that the transceiver failed. Failure of the device at step 509 or at step 514 ends the process at step 138.

Figure 8:
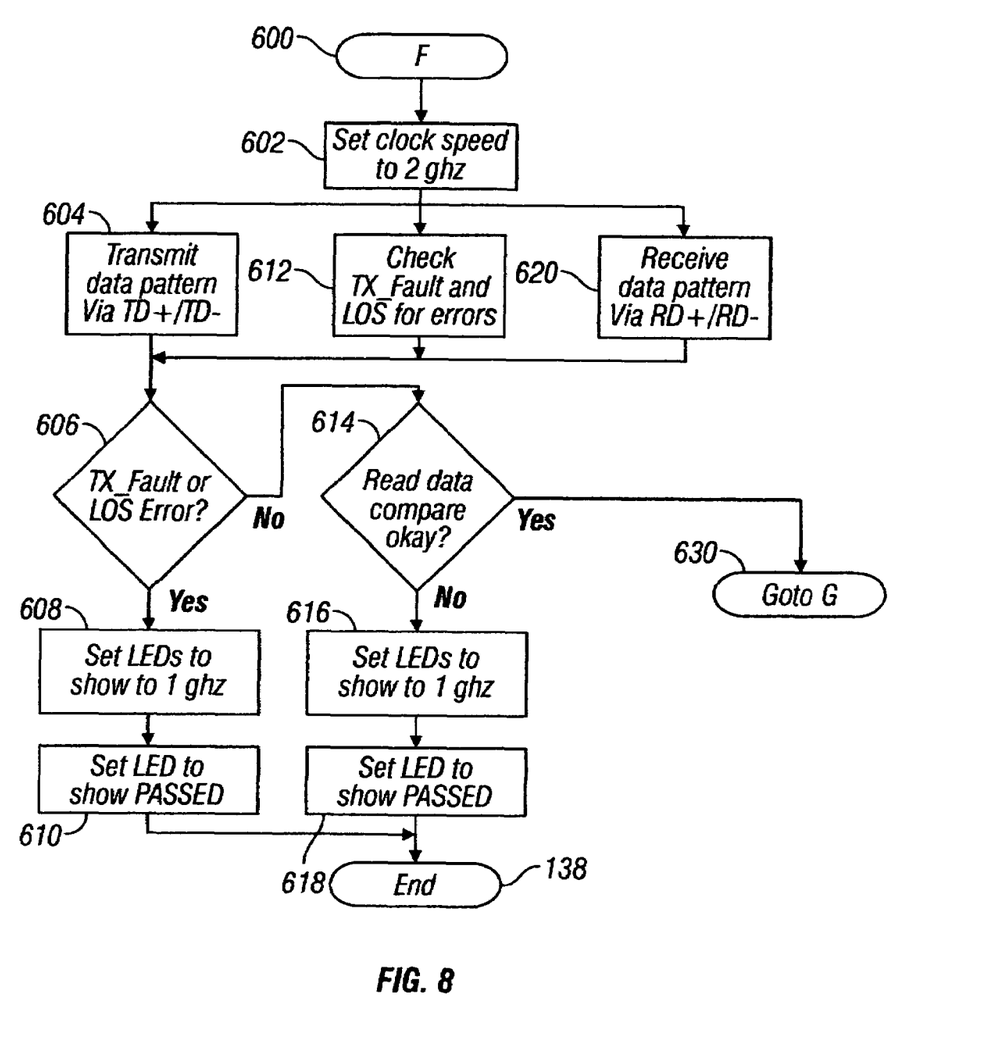

If there was no fault in step 509 and the data pattern comparison of step 514 was OK, the transceiver was operational at the rated speed of the test, which rated speed may or may not be the actual rated speed of the device. Thus, step 530 refers to connector "F" in FIG. 8. FIG. 8 relates to a second, higher rated speed (2 ghz).

Referring to FIGS. 1, 2 and 8, step 600 refers to step 602, in which the transceiver test module sets the clock speed of clock module 50 to operate the transceiver at a second rated test speed, such as 2 ghz. In step 604, the transceiver test module transmits a data pattern, for example, via data and information pins 70, from processor system 30, 32, to operate the transceiver at the second rated test speed. The transceiver should transmit the data pattern to the optical wrap 80 and the same transmission is therefore fed back to the receiver of the transceiver.

In step 612, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 620, the data pattern received by the receiver of the transceiver is provided at the data output of the transceiver, for example at pins 70, and is detected by the transceiver test module.

In step 606, the transceiver test module detects whether a transmission fault or a loss of signal was indicated in the diagnostic information from the transceiver. If so, step 608 sets the visual display 60 to show the rated test speed of the successful test (1 ghz), and step 610 sets the visual display 62 to show that the transceiver had passed at the test speed of the previous test, and therefore that the rated speed of the transceiver is the rated speed of the previous test.

In step 614, the transceiver test module compares the data pattern of the signal provided at the plug interface in step 604 with the data pattern of the data signals received at the plug interface in step 620, and if the comparison is not OK, step 616 sets the visual display 60 to show the rated test speed of the successful test (1 ghz), and step 618 sets the visual display 62 to show that the transceiver had passed at the test speed of the previous test, and therefore that the rated speed of the transceiver is the rated speed of the previous test. Failure of the device at step 609 or at step 614 ends the process at step 138.

Figure 9:
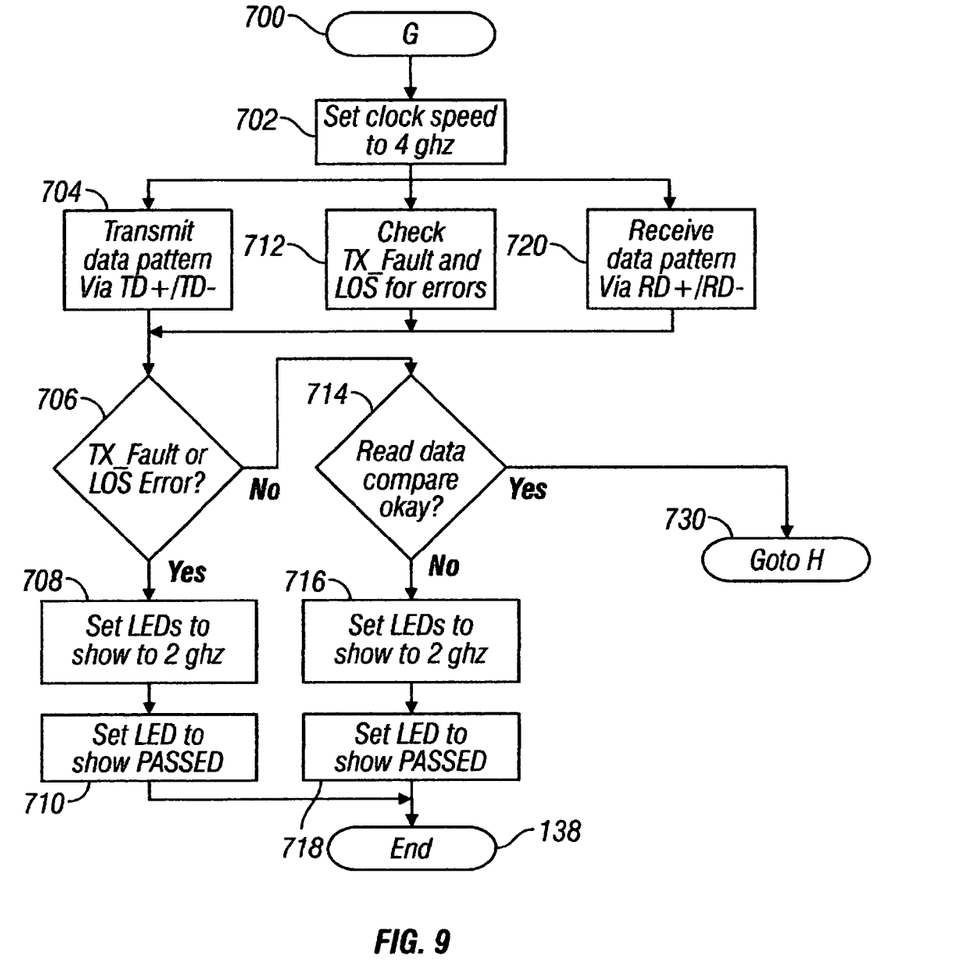

If there was no fault in step 606 and the data pattern comparison of step 614 was OK, the transceiver was operational at the rated speed of the test, which rated speed may or may not be the actual rated speed of the device. Thus, step 630 refers to connector "G" in FIG. 9. FIG. 9 relates to another, higher rated speed (4 ghz).

Referring to FIGS. 1, 2 and 9, step 700 refers to step 702, in which the transceiver test module sets the clock speed of clock module 50 to operate the transceiver at a third, higher rated speed, such as 4 ghz. In step 704, the transceiver test module transmits a data pattern, for example, via data and information pins 70, from processor system 30, 32, to operate the transceiver at the third rated test speed. The transceiver should transmit the data pattern to the optical wrap 80 and the same transmission is therefore fed back to the receiver of the transceiver.

In step 712, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 720, the data pattern received by the receiver of the transceiver is provided at the data output of the transceiver, for example at pins 70, and is detected by the transceiver test module.

In step 706, the transceiver test module detects whether a transmission fault or a loss of signal was indicated in the diagnostic information from the transceiver. If so, step 708 sets the visual display 60 to show the rated test speed of the previous successful test (2 ghz), and step 710 sets the visual display 62 to show that the transceiver had passed at the test speed of the previous test, and therefore that the rated speed of the transceiver is the rated speed of the previous test.

In step 714, the transceiver test module compares the data pattern of the signal provided at the plug interface in step 704 with the data pattern of the data signals received at the plug interface in step 720, and if the comparison is not OK, meaning that the device failed the test at the rated test speed (4 ghz), step 716 sets the visual display 60 to show the rated test speed of the previous successful test (2 ghz), and step 718 sets the visual display 62 to show that the transceiver had passed at the test speed of the previous test, and therefore that the rated speed of the transceiver is the rated speed of the previous test. Failure of the device at step 709 or at step 714 ends the process at step 138.

Figure 10:
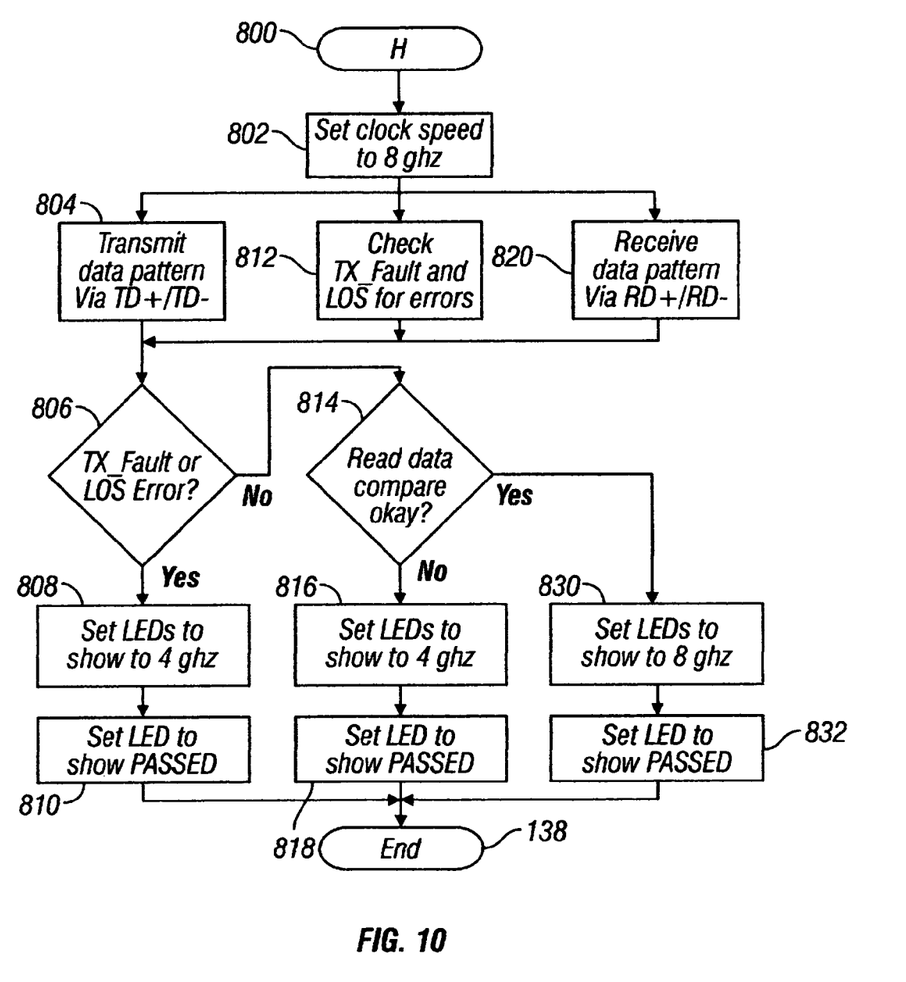

If there was no fault in step 706 and the data pattern comparison of step 714 was OK, the transceiver was operational at the rated speed of the test, which rated speed may or may not be the actual rated speed of the device. Thus, step 730 refers to connector "H" in FIG. 10. FIG. 10 relates to another, still higher rated speed (8 ghz).

Referring to FIGS. 1, 2 and 10, step 800 refers to step 802, in which the transceiver test module sets the clock speed of clock module 50 to operate the transceiver at a fourth rated test speed, such as 8 ghz. In step 804, the transceiver test module transmits a data pattern, for example, via data and information pins 70, from processor system 30, 32, to operate the transceiver at the fourth rated test speed. The transceiver should transmit the data pattern to the optical wrap 80 and the same transmission is therefore fed back to the receiver of the transceiver.

In step 812, the transceiver test module checks the diagnostic information, for example, received at diagnostic pins 72, for transmission fault (such as a laser error at the transmitter called TX_Fault) or for a loss of signal by the receiver (such as a loss of light by the receiver called LOS) during the operation of the transceiver.

In step 820, the data pattern received by the receiver of the transceiver is provided at the data output of the transceiver, for example at pins 70, and is detected by the transceiver test module.

In step 806, the transceiver test module detects whether a transmission fault or a loss of signal was indicated in the diagnostic information from the transceiver. If so, step 808 sets the visual display 60 to show the rated test speed of the previous successful test (4 ghz), and step 810 sets the visual display 62 to show that the transceiver had passed at the test speed of the previous test, and therefore that the rated speed of the transceiver is the rated speed of the previous test.

In step 814, the transceiver test module compares the data pattern of the signal provided at the plug interface in step 804 with the data pattern of the data signals received at the plug interface in step 820, and if the comparison is not OK, meaning that the device failed the test at the rated test speed (8 ghz), step 816 sets the visual display 60 to show the rated test speed of the previous successful test (4 ghz), and step 818 sets the visual display 62 to show that the transceiver had passed at the test speed of the previous test, and therefore that the rated speed of the transceiver is the rated speed of the previous test. Failure of the device at step 809 or at step 814 ends the process at step 138.

If there was no fault in step 806 and the data pattern comparison of step 814 was OK, the transceiver was operational at the rated speed of the test (8 ghz), which rated speed is the highest available and therefore is the actual rated speed of the device. Thus, step 830 sets the visual display 60 to show the rated speed (8 ghz), and step 832 sets the visual display 62 to show that the transceiver passed.

Those of skill in the art will understand that changes may be made with respect to the ordering of the steps and specific pins and detected faults discussed in FIGS. 3, 4, 5, 6, 7, 8, 9 and 10. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A transceiver test module comprising:
a cage configured to support an optical transceiver, said cage having a plug interface configured to interface with an external plug input/output interface of an optical transceiver, and to provide a power connection to said optical transceiver;
an optical wrap comprising a single length of optical fiber cabling and connectors configured to directly interconnect the optical transmitter and optical receiver of said optical transceiver and feed back at least an optical transmission of said optical transmitter to said optical receiver, both of said optical transceiver; and
a processor system configured to interrogate said optical transceiver via said plug interface of said cage; configured to read information from said optical transceiver via said plug interface; configured to parse speed and diagnostic information from said read information of said plug interface; configured to provide a signal to said plug interface to operate said optical transceiver to transmit a signal at said optical transmitter to be fed back to and received at said optical receiver via said optical wrap; configured to detect diagnostic information from said read information of said plug interface for errors of said optical transceiver; and configured to determine the rated speed of said optical transceiver from one of said parsed speed information, if available, and said diagnostic information detected from said read information of said plug interface.

2. The transceiver test module of claim 1, wherein said processor system is configured to provide said signal to operate said optical transceiver at various rated speeds; and configured to verify operation of said optical transceiver at said rated speed of said optical transceiver from said diagnostic information detected from said read information of said plug interface resulting from said signal to operate.

3. The transceiver test module of claim 2, wherein said processor system comprises a clock which operates at rates to provide said signal for each of said various speeds.

4. The transceiver test module of claim 1, additionally comprising a visual display; and
wherein said processor system is configured to determine a pass/fail condition of said optical transceiver from said detected errors; and configured to operate said visual display to display said determined rated speed and to display said pass/fail condition.

5. A method for testing an optical transceiver, comprising the steps of:
providing a cage having a plug interface configured to interface with an external plug input/output interface of an optical transceiver, and to provide a power connection to said optical transceiver;
applying an optical wrap comprising a single length of optical fiber cabling and connectors configured to directly interconnect the optical transmitter and optical receiver of said optical transceiver and feed back at least an optical transmission of said optical transmitter to said optical receiver, both of said optical transceiver;
interrogating said optical transceiver via said plug interface of said cage;
reading information from said optical transceiver via said plug interface of said cage;
parsing speed and diagnostic information from said read information;
providing a signal to said optical transceiver to operate said optical transceiver to transmit a signal at said optical transmitter to be fed back to and received at said optical receiver via said optical wrap;
reading information from said optical transceiver;
detecting diagnostic information from said read information for errors of said optical transceiver; and
determining the rated speed of said optical transceiver from one of said parsed speed information, if available, and said diagnostic information detected from said read information.

6. The method of claim 5, wherein said step of providing a signal comprises providing signals to said plug interface to operate said optical transceiver at various rated speeds, said plug interface configured to interface with an external plug input/output interface of said optical transceiver; and said step of detecting diagnostic information comprises verifying operation of said optical transceiver at said rated speed from said diagnostic information detected from said read information of said plug interface resulting from said signal to operate.

7. The method of claim 6, wherein said step of providing signals comprises operating a clock at rates to provide said signals for each of said various speeds.

8. The method of claim 5, additionally comprising the steps of:
determining a pass/fail condition of said optical transceiver from said detected errors; and
operating a visual display to display said determined rated speed and to display said pass/fail condition.

* * * * *